(12) United States Patent
Chien

(10) Patent No.: US 10,801,948 B2
(45) Date of Patent: Oct. 13, 2020

(54) DETECTION APPARATUS, METHOD AND SYSTEM

(71) Applicants: HKC Corporation Limited, Shenzhen (CN); Chongqing HKC Optoelectronics Technology Co., ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 262 days.

(21) Appl. No.: 15/847,278

(22) Filed: Dec. 19, 2017

(65) Prior Publication Data

US 2018/0306705 A1    Oct. 25, 2018

Related U.S. Application Data

(63) Continuation of application No. PCT/CN2017/091651, filed on Jul. 4, 2017.

(51) Int. Cl.
*G01N 21/21* (2006.01)
*G01N 21/958* (2006.01)
(Continued)

(52) U.S. Cl.
CPC ......... *G01N 21/21* (2013.01); *G01M 11/0257* (2013.01); *G01N 21/5911* (2013.01);
(Continued)

(58) Field of Classification Search
CPC ....... G01M 11/0257; G01N 2021/5957; G01N 21/21; G01N 21/5911; G01N 21/958; G01N 2201/0683
(Continued)

(56) References Cited

U.S. PATENT DOCUMENTS

| 6,035,526 A * | 3/2000 | Saruta ................... G02B 5/201 |
| | | 219/121.13 |
| 2008/0151356 A1* | 6/2008 | Fujita .................... G09G 3/007 |
| | | 359/298 |

(Continued)

OTHER PUBLICATIONS

ISR written search report (dated 2019).*

*Primary Examiner* — Sunghee Y Gray
(74) *Attorney, Agent, or Firm* — WPAT, PC

(57) ABSTRACT

A detection apparatus, a detection method and a detection system are provided. The detection apparatus includes: a light source module used to provide illumination for color filters; an image obtaining module used to obtain image data of the color filters; a light adjusting module disposed at a light-emitting side of the light source module and used to adjust a light direction of the light source module to make the light direction coincide with an orientation of the pixel units on a first direction or a second direction perpendicular to the first direction; a data processing module connected to the image obtaining module and used to perform a processing on the image data and judge whether there is an unqualified pixel unit in the pixel units as per a result of the processing. The light direction is adjustable to coincide with the orientation of pixel units.

11 Claims, 6 Drawing Sheets

(51) Int. Cl.
*G01N 21/59* (2006.01)
*G01M 11/02* (2006.01)

(52) U.S. Cl.
CPC ... *G01N 21/958* (2013.01); *G01N 2021/5957* (2013.01); *G01N 2201/0683* (2013.01)

(58) Field of Classification Search
USPC .................................................. 356/364–370
See application file for complete search history.

(56) References Cited

U.S. PATENT DOCUMENTS

| | | | |
|---|---|---|---|
| 2013/0021466 A1* | 1/2013 | Bordenyuk | G02F 1/1309 348/93 |
| 2014/0062977 A1* | 3/2014 | Wu | G02B 27/2264 345/204 |
| 2014/0184800 A1* | 7/2014 | Hirai | H01L 27/14621 348/148 |
| 2015/0146200 A1* | 5/2015 | Honda | G01N 21/956 356/237.5 |
| 2016/0154269 A1* | 6/2016 | Fukuoka | G02F 1/133536 345/690 |
| 2018/0075615 A1* | 3/2018 | Myokan | G06T 7/55 |
| 2018/0106607 A1* | 4/2018 | Umemura | G06F 17/11 |

\* cited by examiner

DETECTION APPARATUS, METHOD AND SYSTEM

FIELD OF THE DISCLOSURE

The disclosure relates to the field of detection technology, and more particularly to a detection apparatus, a detection method and a detection system.

BACKGROUND

Color filters are widely applied in products based on CMOS (complementary metal oxide semiconductor) technology such as digital cameras, liquid crystal displays and televisions. In an actual production process, a color filter is usually disposed with multiple pixel units arranged in a regular manner, and it is necessary to detect whether there is an unqualified pixel unit on the color filter, which is generally carried out by obtaining a high definition image of the color filter at a certain light illumination condition.

However, a light direction of a light source module of a conventional detection apparatus is usually kept unchanged, when the orientation of the long rectangular pixel units on the color filter which enters into the apparatus for detection does not coincide with the light direction of the light source module, it would cause a difference in the obtained image of the color filter and seriously affect the accuracy of the detection.

SUMMARY

Embodiments of the disclosure provide a detection apparatus, a detection method and a detection system, which can change a light direction of a light source as per an orientation of pixel units on a color filter and thereby improve detection accuracy as well as detection efficiency.

In particular, an embodiment of the disclosure provides a detection apparatus adapted for detecting whether color filters are qualified or not. The color filters each include multiple (i.e., more than one) long rectangular pixel units arranged in a regular manner. The detection apparatus includes:

a light source module, configured (i.e., structured and arranged) for providing illumination for the color filters to be detected;

an image obtaining module, configured for obtaining image data of the color filters;

a light adjusting module, disposed at a light-emitting side of the light source module and configured for adjusting a light direction of the light source module, to make the light direction coincide with an orientation of the pixel units on a first direction or a second direction perpendicular to the first direction;

a data processing module, connected with the image obtaining module and configured for performing a processing on the image data and judging whether there is an unqualified pixel unit in the pixel units as per a result of the processing.

Another embodiment of the disclosure provides a detection method adapted for detecting whether color filters are qualified or not. The color filters each include multiple long rectangular pixel units arranged in a regular manner. The detection method includes:

obtaining an orientation of the pixel units on the color filters to be detected;

judging whether a current light direction of a light source coincides with the orientation of the pixel units on a first direction or a second direction perpendicular to the first direction;

adjusting the light direction when the light direction does not coincide with the orientation of the pixel units, to make the light direction coincide with the orientation of the pixel units;

obtaining image data of the color filters;

performing a data processing on the image data and judging whether there is an unqualified pixel in the pixel units according to a result of the data processing.

Still another embodiment of the disclosure provides a detection system adapted for detecting whether color filters are qualified or not. The color filters each include multiple long rectangular pixel units arranged in a regular manner. The detection system includes:

an inspecting unit, configured for obtaining an orientation of the pixel units on the color filters to be detected;

a judging unit, configured for judging whether a current light direction of a light source coincides with the orientation of the pixel units on a first direction or a second direction perpendicular to the first direction;

an adjusting unit, configured for adjusting the light direction when the light direction does not coincide with the orientation of the pixel units, to make the light direction coincide with the orientation of the pixel units;

an image obtaining unit, configured for obtaining image data of the color filters;

a processing unit, configured for performing a data processing on the image data and judging whether there is an unqualified pixel in the pixel units according to a result of the data processing.

The embodiments of the disclosure adjust the light direction when the light direction of light source does not coincide with the orientation of the pixel units on the color filters and thereby the light direction is adjusted to coincide with the orientation of the pixel units, which can effectively increase detection accuracy and detection efficiency.

BRIEF DESCRIPTION OF THE DRAWINGS

In order to more clearly illustrate technical solutions of embodiments of the disclosure, accompanying drawings used in the description of the embodiments will be briefly described below. Apparently, the drawings in the description below are merely some embodiments of the disclosure, and those skilled in the art can obtain other drawings according to these drawings without creative efforts.

DETAILED DESCRIPTION OF EMBODIMENTS

In order to make those skilled in the art better understand the solution in the disclosure, technical solutions of embodiments of the disclosure will be clearly described below with reference to accompanying drawings of the embodiments. Apparently, the described embodiments are a part of embodiments of the disclosure rather than all the embodiments. Based on the embodiments of the disclosure, all other embodiment obtained by those skilled in the art without creative efforts should belong to the scope of protection of the disclosure.

The term "include/comprise" in specification, claims and accompanying drawings of the disclosure and any modifications thereof are intended to cover non-exclusive inclusion. For example, processes/methods or systems/products/apparatuses including a series of steps or units are not limited to the steps or units as listed, but optionally also include steps or units not listed, or alternatively also includes other steps or units inherent in these processes, methods, products or apparatuses. In addition, the terms "first", "second" and "third" are used to distinguish different objects, rather than describing a particular order.

The disclosure is mainly directed to an improvement of a detection apparatus for conventional Digital Marco type products (e.g., liquid crystal displays, televisions, digital cameras, etc.).

A detection principle of the conventional detection apparatus is that using a light source to illuminate color filters, then obtaining high definition images of the colors filter and analyzing an abnormal imaging area on the high definition images to judge whether each long rectangular pixel unit on the color filter product is qualified or not.

However, in the actual detection, the same detection apparatus may be used to detect color filters of different specification sizes, orientations of pixel units on the color filters of different specification sizes are not the same, pixel units of some of the color filters are arranged along a first direction, while pixel units of the other of the color filters are arranged along a second direction perpendicular to the first direction, but a light direction of the light source of the detection apparatus is usually fixed, if the detection apparatus is designed to detect the color filter of which pixel units are arranged along the first direction, and when the detection apparatus is used to detect the color filter of which pixel units are arranged along the second direction, the obtained high definition image of the color filter would be relatively dark and appear many Muras, which seriously affect the detection accuracy. Therefore, the conventional detection apparatus is not suitable for detecting a digital Marco product containing color filters with a variety of sizes, and the detection efficiency is extremely low when detecting the digital Marco product containing color filters with a variety of sizes.

Figure 1:
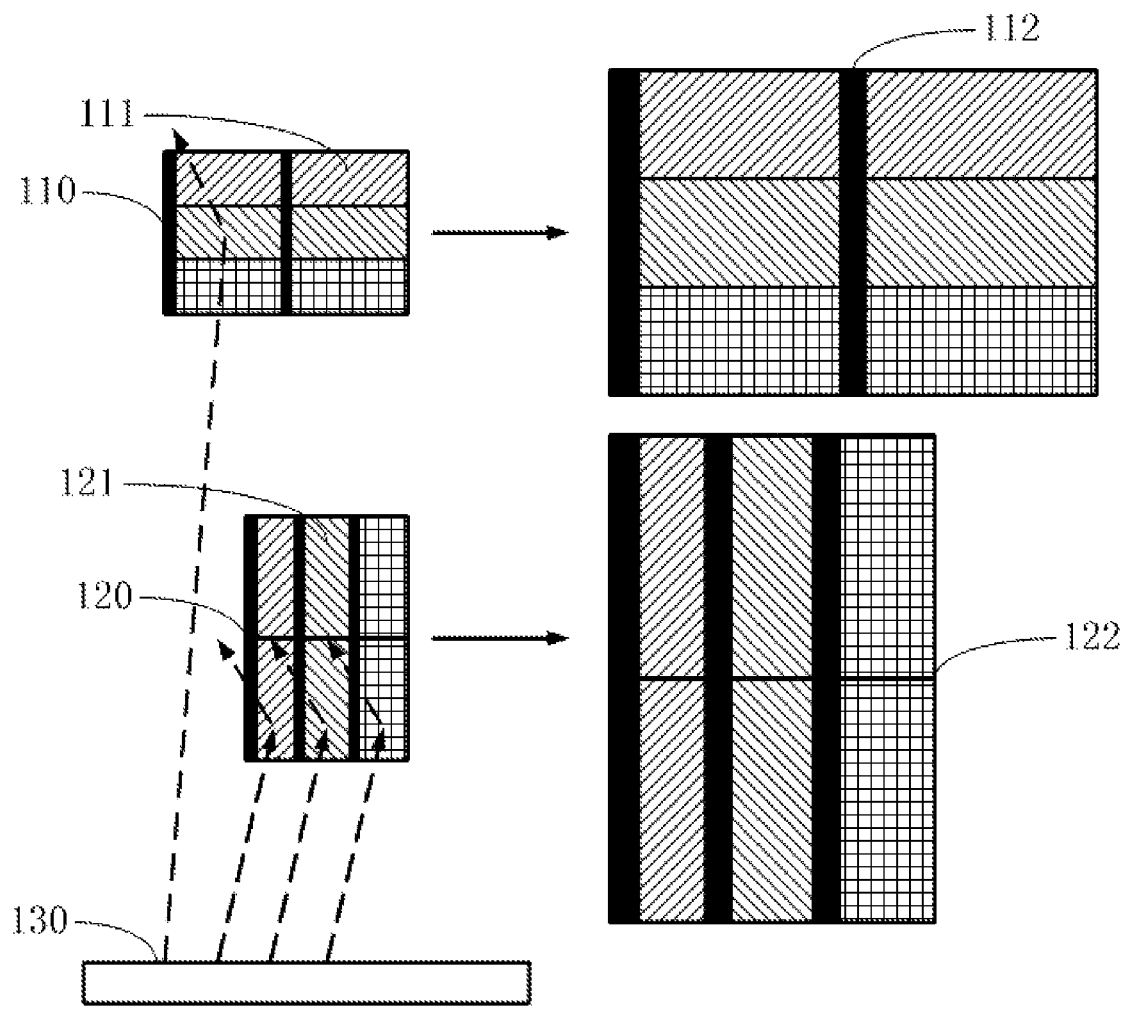
FIG. 1 is a schematic diagram of detection principle of color filters according to an example of the disclosure.

Referring to FIG. 1, in an example, a detection principle of the color filter is that:

a color filter 110 and a color filter 120 each enter a detection apparatus along the direction of solid arrow as shown in the drawing, an orientation of pixel units 111 on the color filter 110 is a first direction, an orientation of pixel units 121 on the color filter 120 is a second direction perpendicular to the first direction, a light direction of a light source module 130 coincides with the orientation of the pixel units 111 on the color filter 110, the obtained high definition image 112 of the color filter 110 is normal, while the obtained high definition image 122 of the color filter 120 is relatively dark and appears many Muras.

Embodiments of the disclosure are to solve the above problem and thus provide a detection apparatus, a detection method and a detection system, which can correspondingly change a light direction of a light source according to an orientation of pixel units on a color filter to be detected and thereby make the light direction coincide with the orientation of pixel units, and therefore can effectively reduce the difference of obtained high definition image and increase detection accuracy as well as detection efficiency.

Figure 2:
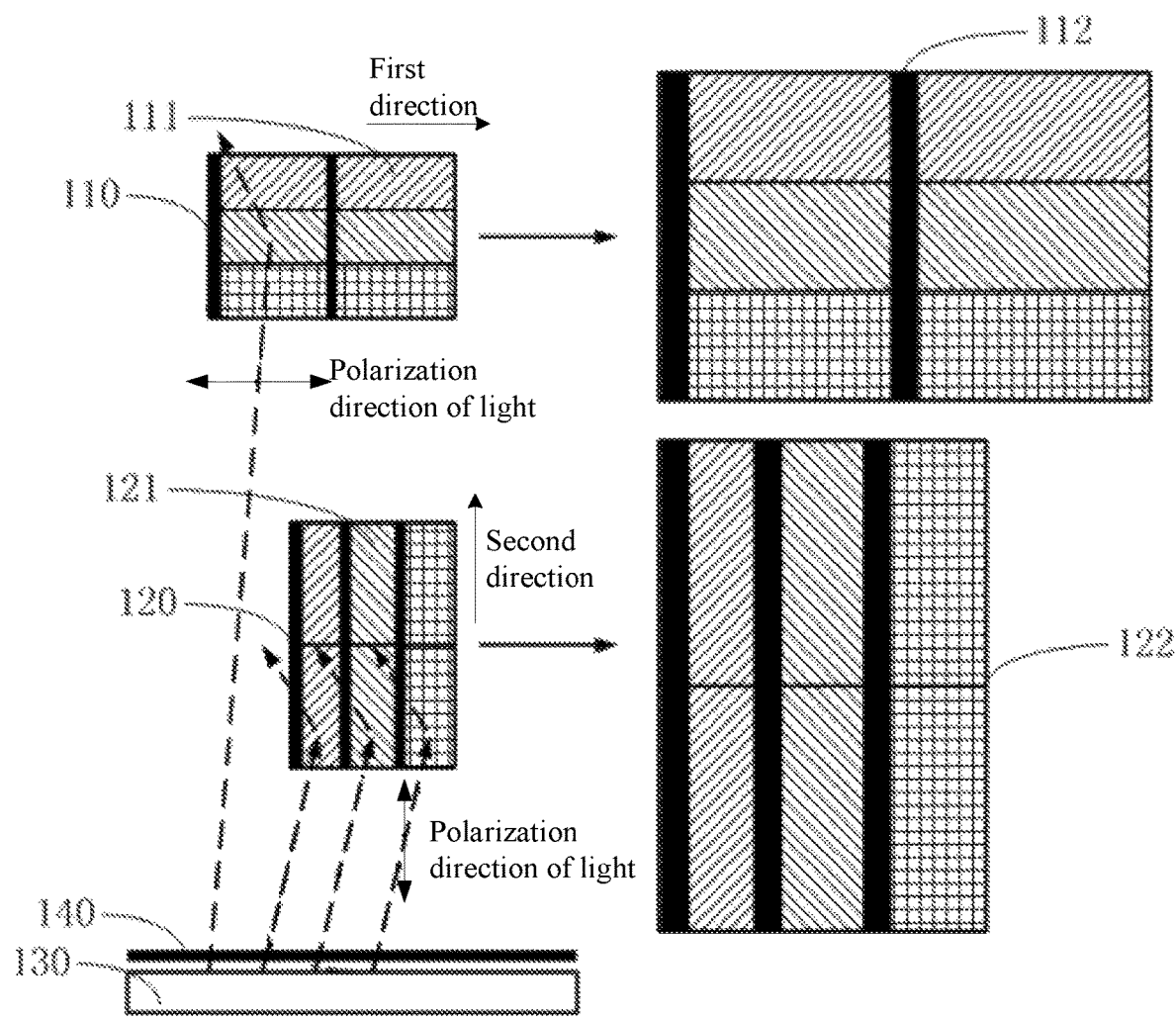
FIG. 2 is a schematic diagram of detection principle of color filters according to an embodiment of the disclosure.

Referring to FIG. 2, a detection principle of a color filter which all embodiments provided by the disclosure are based on is that:

a color filter 110 and a color filter 120 each enter a detection apparatus along the direction of solid arrow as shown in the drawing, an orientation of pixel units 111 on the color filter 110 is a first direction, an orientation of pixel units 121 on the color filter 120 is a second direction perpendicular to the first direction, a light adjusting module 140 is disposed at a light-emitting side of a light source module 130, so that a light direction of the light source module 130 illuminated on the color filter 110 coincides with the orientation of the pixel units 111, and a light direction of the light source module 130 illuminated on the color filter 120 also coincides with the orientation of the pixel units 121, the obtained high definition images 112 and 122 of the color filter 110 and the color filter 120 both are normal, there is no occurrence of dark image or mura problem caused by light, two double-arrow lines in the drawing represents polarization directions of the light.

Figure 3:
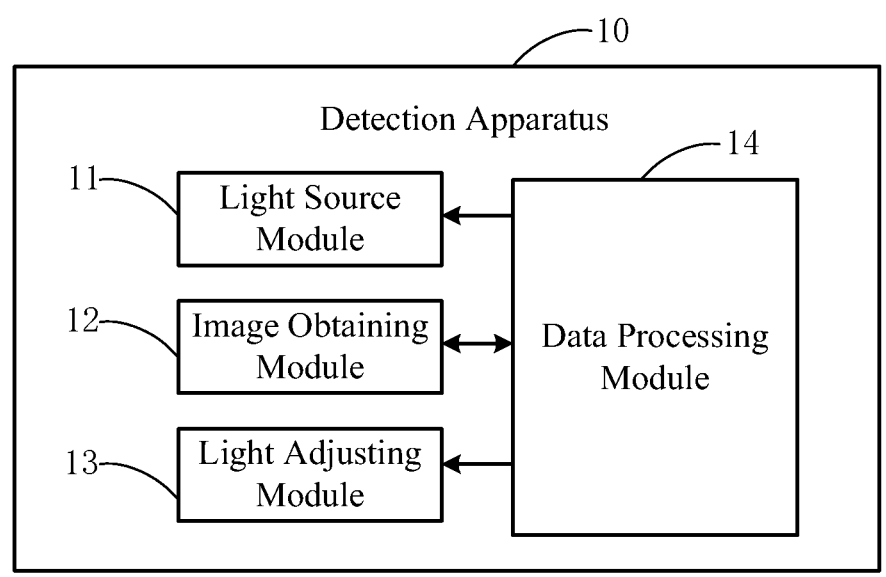
FIG. 3 is a schematic structural view of a detection apparatus according to an embodiment of the disclosure.

Referring to FIG. 3, an embodiment of the disclosure provides a detection apparatus 10 including:

a light source module 12, configured (i.e., structured and arranged) to provide an illumination for a color filter to be detected;

an image obtaining module 12, configured to obtain image data of the color filter;

a light adjusting module 13, disposed at a light-emitting side of the light source module 11 and configured to adjust a light direction of the light source module 11, to make the light direction coincide with an orientation of pixel units on a first direction or a second direction perpendicular to the first direction;

a data processing module 14, connected with the image obtaining module 12 and configured to perform a processing on the image data and judge whether there is an unqualified pixel unit in the pixel units according to a result of the processing.

In an embodiment, the light source module 11 may be an array light source and configured to emit uniform/even light. In other embodiment, it may be other point light source, line light source or surface light source which can emit even light, and the disclosure does not particularly limit the type of the light source module 11. In the illustrated embodiment, the light source module 11 is connected with the data processing module 14 and is controlled by the data processing module 14 to be turned on or off.

In an embodiment, the image obtaining module 12 may be a Marco camera and is configured to obtain a high definition image of the color filter. In other embodiment, it may be other image capturing equipment capable of obtaining an image, and the disclosure does not particularly limit the type of the image obtaining module 12.

In an embodiment of the disclosure, the data processing module 14 is concretely configured to detect whether brightnesses of the pixel units are even or not, if not, the pixel unit with uneven brightness is judged to be unqualified.

In a specific application, judging whether brightness of a pixel unit is even or not can be realized by judging whether there is a mura of uneven brightness on the pixel unit, if there is a mura of uneven brightness, the brightness of the pixel unit is judged to be uneven, otherwise the brightness of the pixel unit is judged to be even. In other application, other method can be used to judge whether brightness of a pixel unit is even or not, and the embodiment does not particularly limit the judging method.

In a specific application, the data processing module 14 may be a PC (personal computer) client, or is embodied by a general purpose integrated circuit such as CPU (central processing unit) or by an ASIC (application specification integrated circuit).

In an embodiment of the disclosure, the light adjusting module 13 is concretely a rotatable polarization filter, which can be rotated by manual control or by a control of electronic or mechanical equipment, to adjust the light direction of the light source module 11. In an embodiment, the light adjusting module 13 may be composed of two polarizers (vertical polarizer and horizontal polarizer). When a vertically polarized light is needed to pass through, the vertical polarizer is in work, while when a horizontally polarized light is needed to pass through, the horizontal polarizer is in work. In other embodiment, the light adjusting module 13 may be other device or material with the function of adjusting light polarization direction, and the disclosure does not particularly limit the type of the light adjusting module 13.

Referring to FIG. 3, in the illustrated embodiment, the data processing module 14 is connected with the light adjusting module 13 and configured to determine an orientation of the pixel units on the color filter according to obtained image data and control the light adjusting module 13 to adjust the light direction of the light source module 11 when the orientation of the pixel units does not coincide with current light direction of the light source module 11.

In an embodiment of the disclosure, the light adjusting module 13 is concretely configured to adjust the light direction of the light source module 11 to be a direction parallel to the first direction when an orientation of pixel units is the first direction, and adjust the light direction of the light source module 11 to be a direction parallel to the second direction when the orientation of pixel units is the second direction.

In an embodiment of the disclosure, the data processing module 14 is further configured to control the light adjusting module to adjust the light direction of the light source module to be parallel to the first direction when the orientation of the pixel units is the first direction, and control the light adjusting module to adjust the light direction of the light source module to be parallel to the second direction when the orientation of the pixel units is the second direction.

Figure 4:
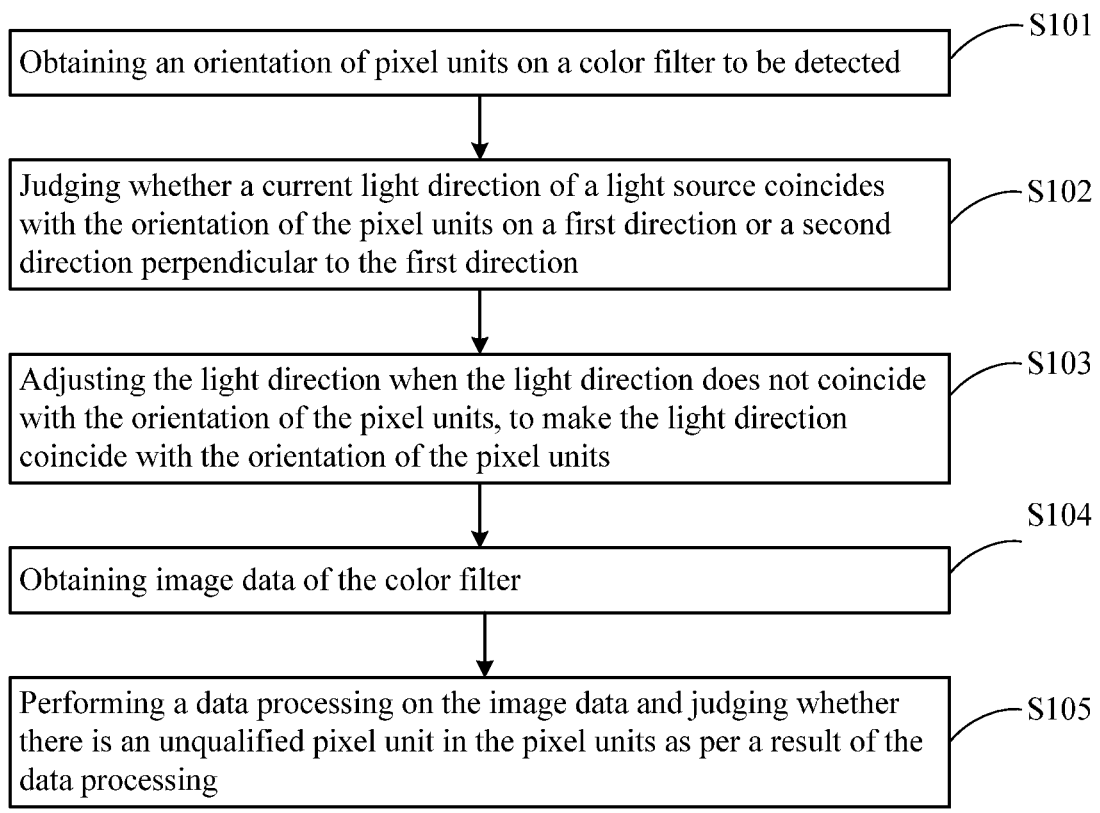
FIG. 4 is a flowchart of a detection method according to an embodiment of the disclosure.

Referring to FIG. 4, another embodiment of the disclosure provides a detection method. The method may be implemented based on the above detection apparatus 10, or is implemented based on an apparatus having same or similar function as the detection apparatus 10. The detection method includes following steps.

Step S101: obtaining an orientation of multiple pixel units on a color filter to be detected.

In an embodiment, a camera is used to capture an image of the color filter so as to obtain the orientation of the pixel units. In other embodiment, it may be that data or instruction representing the orientation is manually inputted by the user.

Step S102: judging whether a current light direction of a light source coincides with the orientation of the pixel units on a first direction or a second direction perpendicular to the first direction.

In an embodiment of the disclosure, the light source has a preset initial light direction, and the current light direction of the light source can be acquired by directly obtaining pre-stored initial light direction data. If there is no special adjustment, the current light direction of the light source is always kept unchanged in its initial light direction.

In an embodiment of the disclosure, after the light direction is adjusted, adjusted light direction data is stored, when it is needed to judge whether the light direction coincides with the orientation of the pixel units by the step S102 next time, the light direction can be obtained by directly calling the stored light direction data.

Step S103: adjusting the light direction when the light direction does not coincide with the orientation of the pixel units, to make the light direction coincide with the orientation of the pixel units.

In a specific application, the step S103 specifically includes:

when the orientation of the pixel units is the first direction, adjusting the light direction of the light source module to be a direction parallel to the first direction;

when the orientation of the pixel units is the second direction, adjusting the light direction of the light source module to be a direction parallel to the second direction.

in an embodiment of the disclosure, the first direction is a horizontal direction, the second direction is a vertical direction, and the step S103 specifically includes:

when the orientation of the pixel units is the first direction, adjusting the light direction of the light source to be the horizontal direction parallel to the first direction;

when the orientation of the pixel units is the second direction, adjusting the light direction of the light source module to be the vertical direction parallel to the second direction.

In an embodiment of the disclosure, the horizontal direction specifically is a direction coincided with a flow direction of the color filter (i.e., a delivery direction of the color filter on the pipeline for detection), correspondingly the vertical direction is a direction perpendicular to the flow direction.

Step S104: obtaining image data of the color filter.

In a specific application, a camera may be used to obtain the image data of the color filter, and the step S101 and the step S104 can be carried out by the same camera.

Step S105: performing a data processing on the image data and judging whether there is an unqualified pixel unit in the pixel units as per a result of the data processing.

In an embodiment of the disclosure, the step S105 specifically includes: performing a magnifying processing on the image data, and judging whether there is an unqualified pixel unit in the pixel units according to an abnormal noise of the magnified image data, if a position on the image data corresponding to a certain pixel unit has an abnormal noise, the pixel unit with the abnormal noise is judged to be unqualified.

In an embodiment of the disclosure, the step S105 concretely may be embodied by a PC (personal computer) client with data processing function, or a highly integrated data processing circuit or chip.

In an embodiment of the disclosure, the detection method provided by the illustrated embodiment may be implemented by the data processing module of the embodiment corresponding to FIG. 2.

Figure 5:
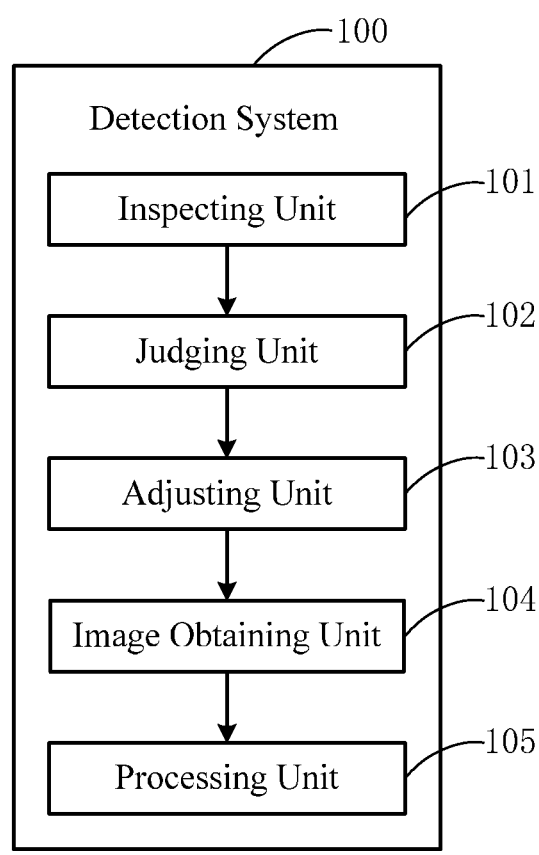
FIG. 5 is a structure block diagram of a detection system according to an embodiment of the disclosure.

Referring to FIG. 5, still another embodiment of the disclosure provides a detection system 100 adapted for implementing steps in the method embodiment corresponding to FIG. 4. The detection system 100 includes:

an inspecting unit 101, configured to obtain an orientation of multiple pixel units on a color filter to be detected;

a judging unit 102, configured to judging whether a current light direction of a light source coincides with the orientation of the pixel units on a first direction or a second direction perpendicular to the first direction;

an adjusting unit 103, configured to adjust the light direction when the light direction does not coincide with the orientation of the pixel units, to make the light direction coincide with the orientation of the pixel units;

an image obtaining unit 104, configured to obtaining image data of the color filter;

a processing unit 105, configured to perform a data processing on the image data and judge whether there is an unqualified pixel unit in the pixel units as per a result of the data processing.

In an embodiment, the adjusting unit 103 is specifically configured to:

adjust the light direction of the light source module to be a direction parallel to the first direction when the orientation of the pixel units is the first direction;

adjust the light direction of the light source module to be a direction parallel to the second direction when the orientation of the pixel units is the second direction.

In an embodiment, the processing unit 105 is specifically configured to: perform a magnifying processing on the image data and judge whether there is an unqualified pixel unit in the pixel units as per an abnormal noise on the magnified image data, if a position on the image data corresponding to a certain pixel unit has an abnormal noise, the pixel unit with the abnormal noise is judged to be unqualified.

In an embodiment, the detection system 100 further includes:

an accessing unit, configured to access pre-stored initial light direction data to acquire the current light direction of the light source.

In an embodiment, the detection system 100 further includes:

a storing unit, configured for saving adjusted light direction data.

In an embodiment, the detection system 100 provided by the illustrated embodiment may be a software system of the data processing module in the embodiment corresponding to FIG. 2.

Figure 6:
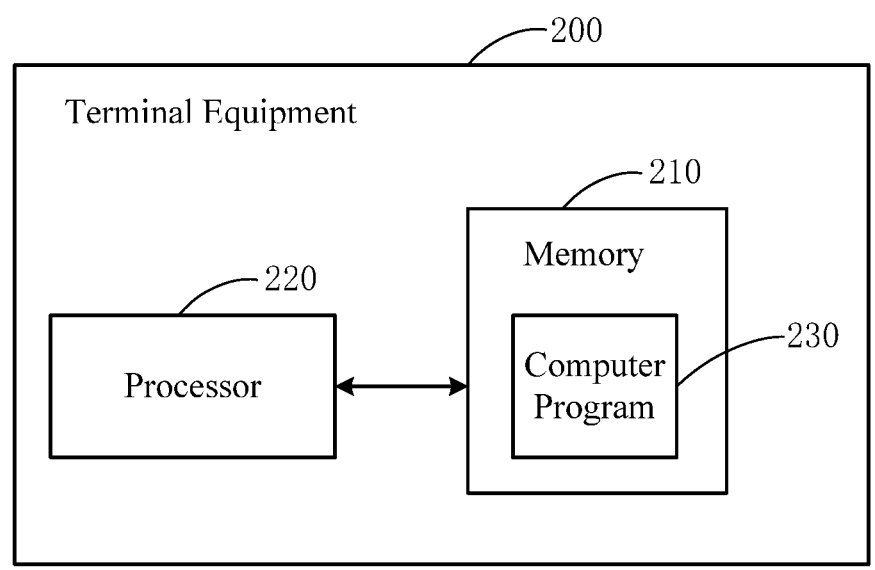
FIG. 6 is a structure block diagram of a terminal equipment according to an embodiment of the disclosure.

Referring to FIG. 6, an embodiment of the disclosure provides a terminal equipment 200 including a memory 210, a processor 220 and a computer program 230 stored in the memory and executable in the processor 220. When the processor 220 executes the computer program 230, it carries out following steps:

obtaining an orientation of multiple pixel units on a color filter to be detected;

judging whether a current light direction of a light source coincides with the orientation of the pixel units on a first direction or a second direction perpendicular to the first direction;

adjusting the light direction when the light direction does not coincide with the orientation of the pixel units, to make the light direction coincide with the orientation of the pixel units;

obtaining image data of the color filter;

performing a data processing on the image data and judging whether there is an unqualified pixel unit in the pixel units as per a result of the data processing.

In an embodiment of the disclosure, when the processor executes the computer program, it may further carry out the following step(s):

adjusting the light direction of the light source to be a direction parallel to the first direction when the orientation of the pixel units is the first direction;

adjusting the light direction of the light source to be a direction parallel to the second direction when the orientation of the pixel units is the second direction.

An even still another embodiment of the disclosure provides a computer readable storage medium, the computer readable storage medium is stored with the computer program. When the computer program is executed by one or more processors, it can carry out following steps:

obtaining an orientation of multiple pixel units on a color filter to be detected;

judging whether a current light direction of a light source coincides with the orientation of the pixel units on a first direction or a second direction perpendicular to the first direction;

adjusting the light direction when the light direction does not coincide with the orientation of the pixel units, to make the light direction coincide with the orientation of the pixel units;

obtaining image data of the color filter;

performing a data processing on the image data and judging whether there is an unqualified pixel unit in the pixel units as per a result of the data processing.

In an embodiment of the disclosure, when the computer program is executed by the processor(s), it may further carry out the following step(s):

adjusting the light direction of the light source to be a direction parallel to the first direction when the orientation of the pixel units is the first direction;

adjusting the light direction of the light source to be a direction parallel to the second direction when the orientation of the pixel units is the second direction.

Each unit in all the embodiments of the disclosure can be implemented by a general purpose integrated circuit such as CPU (central processing unit), or by an ASIC (application specific integrated circuit).

The steps in methods of all the embodiments of the disclosure may be made with an order adjustment, combined and subtracted according to actual needs.

The units in systems of all the embodiments of the disclosure may be combined, divided and subtracted according to actual needs.

It should be understood to those skilled in the art that the all or a part of procedures in the methods of the above embodiments can be accomplished by a computer program instructing related hardware, the program may be stored in a computer readable storage medium, and when the program is executed, the procedures of the embodiments of above described respective methods may be included. The storage medium may be a magnetic disk, an optical disk, a read-only memory (ROM) or a random access memory (RAM), and so on.

The foregoing contents merely are preferred embodiments of the disclosure and not intended to limit the disclosure. Any modifications, equivalent substitutions and improvements within the spirit and principles of the disclosure should be included within the scope of protection of the disclosure.

What is claimed is:

1. A detection apparatus, adapted for detecting whether color filters are qualified or not, wherein the color filters comprise a plurality of long rectangular pixel units arranged in a regular manner; and the detection apparatus comprises:

a light source, configured to provide illumination for the color filters to be detected;

an image obtainer, configured to obtain image data of the color filters;

a light polarization adjuster, disposed at a light-emitting side of the light source and configured to adjust a light polarization direction of the light source, to make the light polarization direction coincide with an orientation of the pixel units on a first direction or a second direction, wherein the second direction is perpendicular to the first direction, and the orientation of the pixel units is same as a length direction or a width direction of the pixel unit;

a data processor, connected to the image obtainer and the light polarization adjuster and configured to perform a processing on the image data and judge whether there is an unqualified pixel unit in the pixel units as per a result of the processing, wherein the data processor is further configured to determine the orientation of the pixel units according to the image data and control the light polarization adjuster to adjust the light polarization direction of the light source when the orientation of the pixel units does not coincide with a current light polarization direction of the light source.

2. The detection apparatus as claimed in claim 1, wherein the data processor is further configured to:

control the light polarization adjuster to adjust the light polarization direction of the light source to be a direction parallel to the first direction when the orientation of the pixel units is the first direction;

control the light polarization adjuster to adjust the light polarization direction of the light source to be a direction parallel to the second direction when the orientation of the pixel units is the second direction.

3. The detection apparatus as claimed in claim 1, wherein the light polarization adjuster is concretely configured to:

adjust the light polarization direction of the light source to be a direction parallel to the first direction when the orientation of the pixel units is the first direction;

adjust the light polarization direction of the light source to be a direction parallel to the second direction when the orientation of the pixel units is the second direction.

4. The detection apparatus as claimed in claim 1, wherein the light polarization adjuster is a rotatable polarization filter.

5. The detection apparatus as claimed in claim 1, wherein the data processor is concretely configured to detect whether brightnesses of the pixel units are even or not and judge the pixel unit with uneven brightness to be unqualified when brightnesses of the pixel units are not even.

6. The detection apparatus as claimed in claim 1, wherein the light source is an array light source.

7. The detection apparatus as claimed in claim 1, wherein the image obtainer is a Marco camera.

8. The detection apparatus as claimed in claim 1, wherein the data processor is a PC client or a CPU.

9. The detection apparatus as claimed in claim 1, wherein the image data is a high definition image.

10. The detection apparatus as claimed in claim 1, wherein a direction of the color filters entering the detection apparatus is the first direction.

11. The detection apparatus as claimed in claim 1, wherein the light source is connected with the data processor and subjected to the control of the data processor to be turned on or off.

* * * * *